(No Model.) 4 Sheets—Sheet 1.

J. B. SMITHMAN.
CABLE RAILWAY.

No. 496,236. Patented Apr. 25, 1893.

WITNESSES
James K. Bakewell
W. H. Swartz

INVENTOR
John B. Smithman (No Model.) 4 Sheets—Sheet 2.
J. B. SMITHMAN.
CABLE RAILWAY.
No. 496,236. Patented Apr. 25, 1893.
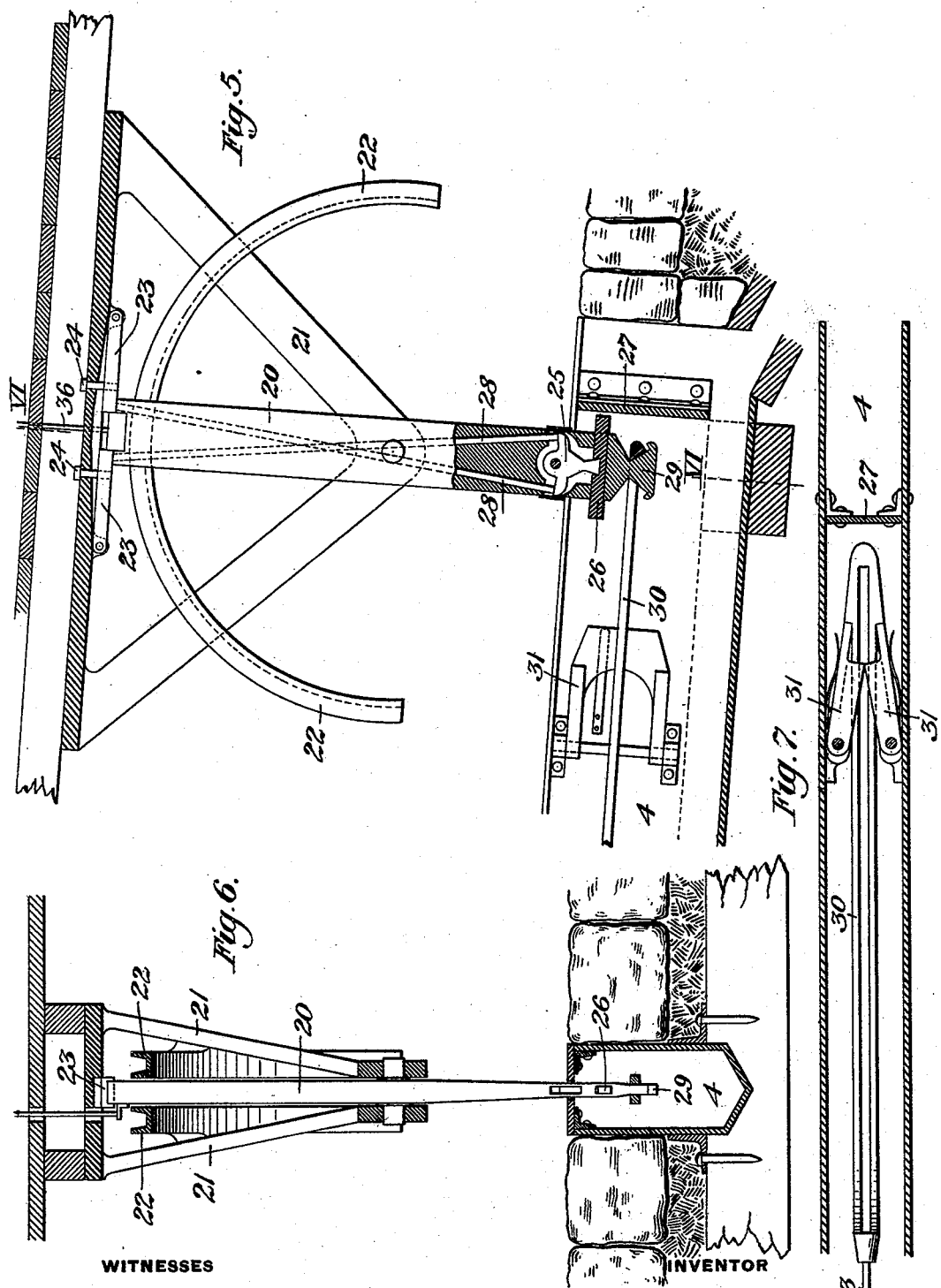
WITNESSES
INVENTOR (No Model.) 4 Sheets—Sheet 3.
J. B. SMITHMAN.
CABLE RAILWAY.
No. 496,236. Patented Apr. 25, 1893.
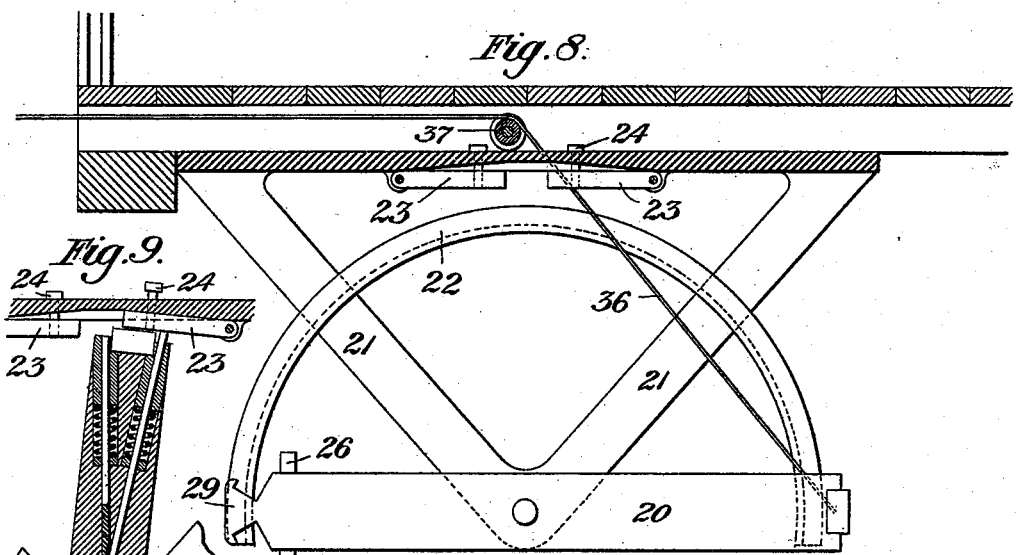
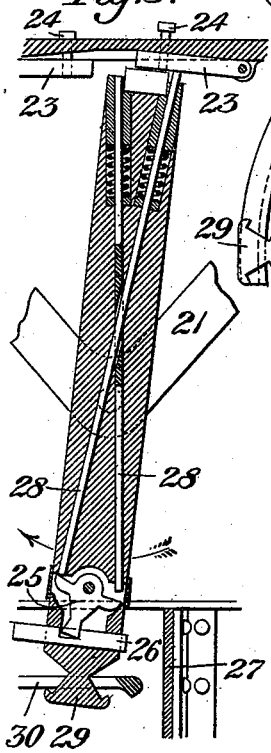
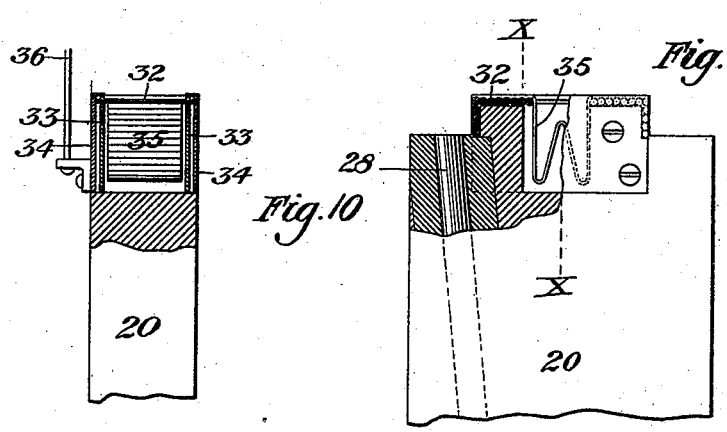
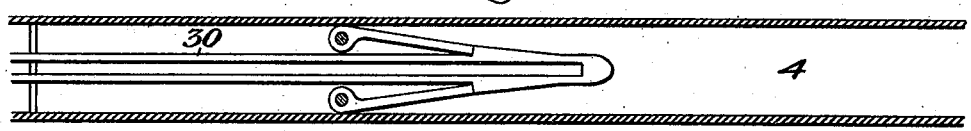
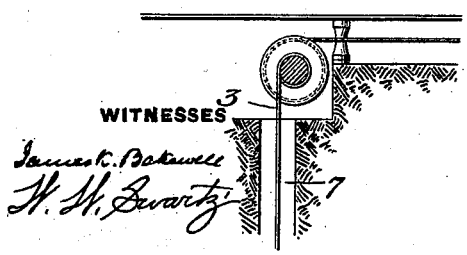
WITNESSES
INVENTOR
John B. Smithman (No Model.) 4 Sheets—Sheet 4.
J. B. SMITHMAN.
CABLE RAILWAY.
No. 496,236. Patented Apr. 25, 1893.
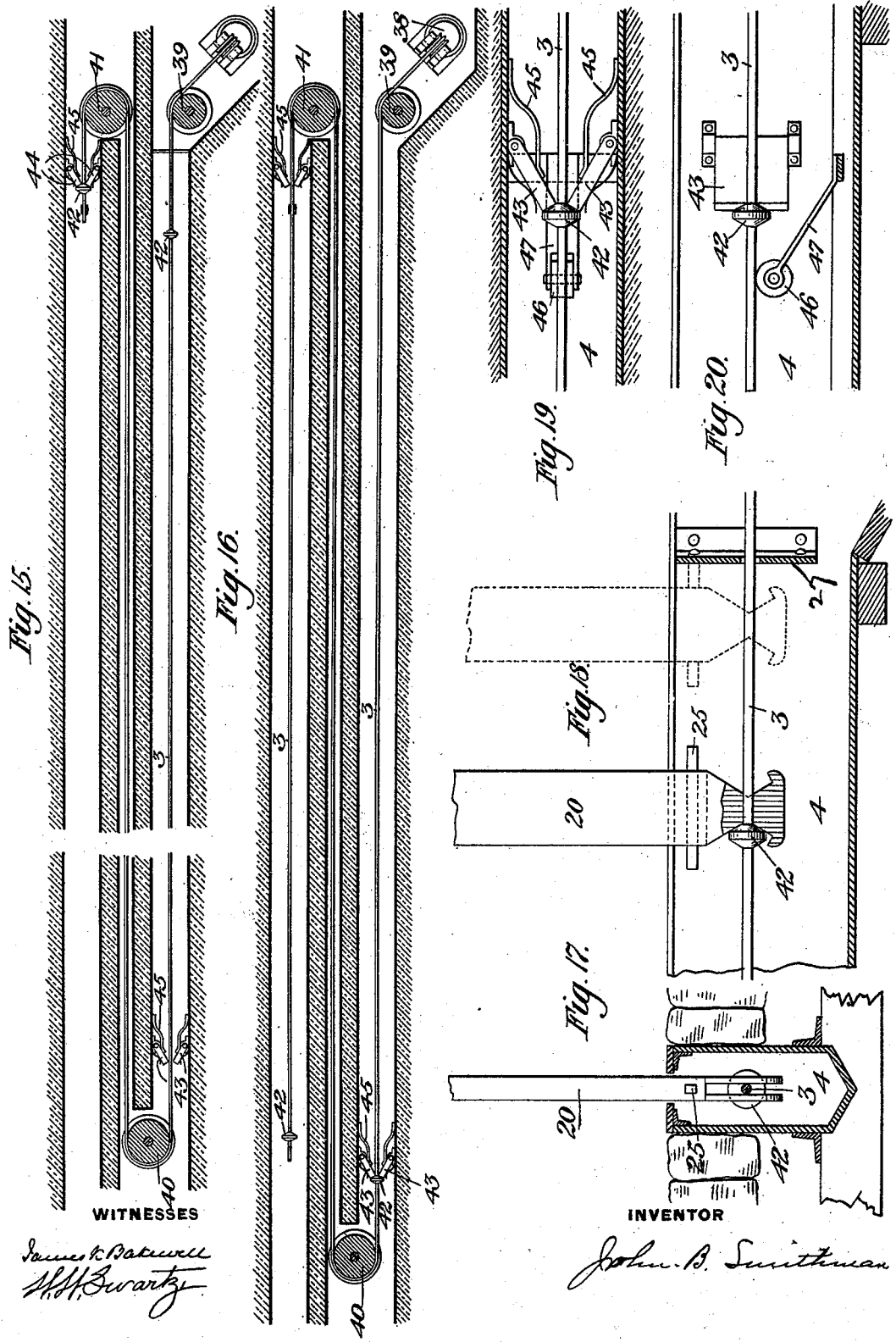
WITNESSES INVENTOR

UNITED STATES PATENT OFFICE.

JOHN B. SMITHMAN, OF OIL CITY, PENNSYLVANIA.

CABLE RAILWAY.

SPECIFICATION forming part of Letters Patent No. 496,236, dated April 25, 1893.

Application filed December 19, 1892. Serial No. 455,574. (No model.)

*To all whom it may concern:*

Be it known that I, JOHN B. SMITHMAN, of Oil City, in the county of Venango and State of Pennsylvania, have invented a new and useful Improvement in Cable Railways, of which the following is a full, clear, and exact description, reference being had to the accompanying drawings, forming part of this specification, in which—

Figure 1:
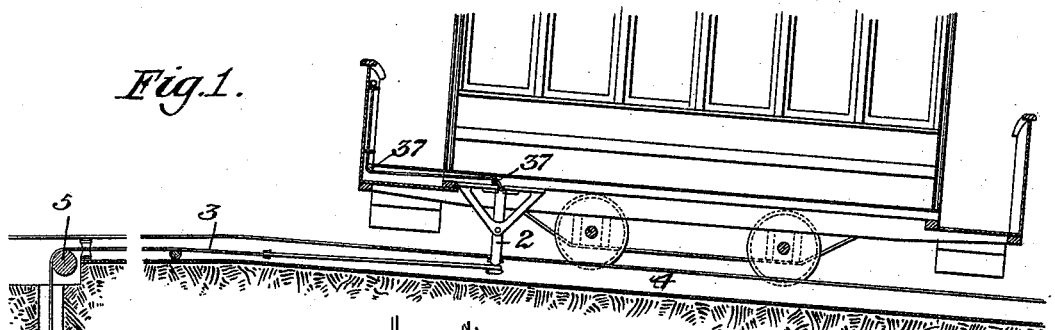
Figure 2:
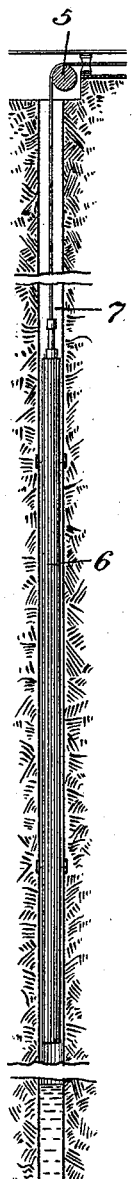
Figure 4:
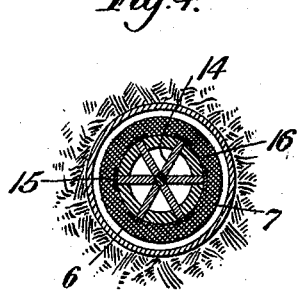
Figure 3:
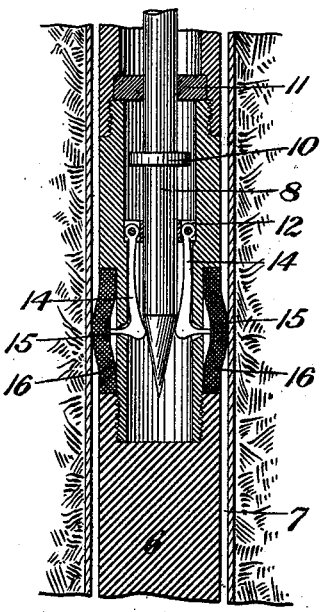

Figure 1 is a side view of a street-car provided with my improved motor and brake. Figs. 2 and 3 are vertical sectional views of the vertical cylinder with the automatic weight employed as a motor; and Fig. 4 is a cross-sectional view of the same on the line IV—IV of Fig. 2. Fig. 5 is a side elevation, partly in section, of the automatic grip and its attachments; and Fig. 6 is a vertical section of the same on the line VI—VI of Fig. 5. Fig. 7 is a horizontal section of the end of the tunnel, showing the attachments at the end of the cable. Figs. 8 and 9 are a side elevation and a vertical section, respectively, of the grip in different positions. Figs. 10 and 11 are detail views of the upper end of the swinging grip; and Figs. 12, 13 and 14 are other detail views hereinafter referred to. Figs. 15 and 16 are horizontal sectional views of the tunnel and cable used with a double-track road. Figs. 17 and 18 are detail views of the modified grip employed therein. Figs. 19 and 20 are detail views of the slots and connections employed therefor.

Like symbols of reference indicate like parts in each figure.

My invention relates to the operating of street railways, cars or other wheeled vehicles upon grades or inclines, and its object is to economize the motive power necessary to drive cars up such inclines, and it is especially applicable as an auxiliary power for street railways.

It consists, broadly, in storing up, by means of a weight moving in a vertical well or conduit at the upper end of the grade, the power obtained by a car passing down the grade under the influence of gravity, and utilizing said power to assist the same or another car in ascending the grade; and also in the use of air or other fluid or liquid contained in the cylinder for the purpose of regulating the ascent and descent of the weight. A safety brake is thereby obtained for the descending cars and a smaller motive force will suffice to move cars up the grade.

In the drawings, Figures 1, 2 indicates an automatic grip which may be attached to or detached from a cable 3, which is located in a tunnel 4, which is built between the rails upon the grade in the same manner as an ordinary cable-road. This cable passes over the pulley 5, and at its end is secured to a weight 6, which hangs in a vertical hole or well 7. This weight is preferably of the same shape of and slightly smaller than the conduit and is made in sections, it being sufficiently heavy to slightly overbalance the car when it is about midway of the incline. The weight may be of adhesive material upon its exterior if desired, and I construct it so as to gage the annular space between the weight and the cylinder for the purpose of retarding and regulating its velocity by means of the fluid which I employ within the cylinder for that purpose, the fluid acting as a dash-pot upon the weight, preventing its too rapid movement. A disk 18 is used to regulate the diameter of the weight, disks of different size being employed where greater or less resistance is desired.

To further regulate the action of the power, I construct the weight as shown in Figs. 2 and 3, in which 8 is a rod to which the cable is attached. This rod passes through the upper end of the weight into a cavity therein, and fastened upon the rod are two collars 9 and 10. Two disks 11 and 12 surround the rod; these disks are fastened to the casing and are made as air-tight as possible, and the weight hangs upon a spiral spring 13 surrounding the rod 8 and bearing upon the collar 9. To the disk 12 are pivoted swinging distenders or lever-fingers 14, which pass through holes in the incasing weight, and press against small plates 15 upon the inside of a rubber collar or cylinder 16, fitting in an annular recess around the weight, these lever-fingers being operated by the lower conical end of the rod as shown.

The spring 13 is of such strength that when the weight is in position, the collar 10 barely touches the disk 11, and the space within the case is filled with oil or similar fluid. Now if the car which has been connected with the other end of the cable moves too rapidly up the incline, the spring which was compressed by the weight, will expand and, forcing the rod downwardly, will drive out the lever-fingers against the rubber collar and distend the same, thereby decreasing the annular space between the weight and the sides of the well, and proportionately decreasing its speed. If the cable should break the spring, being released, will force the band 16 against the sides of the conduit and prevent its fall to the bottom of the conduit. To further assist in this regulation, a rubber or flexible disk 17 is secured between an inner annular shoulder upon a collar 18 and a cap 19 at the top of the weight. Now if the weight moves upward too rapidly or a car moves down the grade, the fluid in the conduit presses downwardly upon this disk and causes it to act as a valve, its free rim being depressed and thereby brought nearer the conduit sides, thus decreasing the speed of the weight.

To regulate the change of equilibrium which takes place as the cable is drawn within the conduit, I preferably fill about one-third of the well with oil, as shown in Fig. 1, so that when the weight enters the oil its specific gravity is correspondingly decreased. When the oil is thus used, I balance the car and the power when the car is one-third up the incline, instead of half way up as before.

The automatic grip which I employ is shown upon Sheets 2 and 3 of the drawings, 20 being the swinging grip-beam, pivoted near its center between the supporting hangers 21. Two semi-circular guides 22 are provided, between which the upper end of the grip-beam moves, and when in vertical position, it is held rigidly by two swinging dogs 23, which drop into off-sets in its upper end and are limited in their downward movements by the headed pins 24 attached thereto and moving through slots in the support to which the dogs are pivoted. A three-armed lever 25 is pivoted within the grip-beam near its lower end, the lower arm taking into the recess of a sliding trigger or block 26, which trigger is struck by suitable stop-plates 27 near the ends of the tunnel. Upon the two upper arms of the lever, rest the diagonally-placed trip-rods 28, which pass upwardly through the beam and are normally flush with the lower face of the offsets at its upper end. When, however, the sliding trigger 26 strikes one of the stop-plates 27, the lever 25 is tilted and thereby one of the dogs 23 is lifted to allow the tilting of the grip-beam into its inoperative position, as shown in Fig. 8.

The lower end of the grip-beam terminates in a double catch 29, which is adapted to enter the slot in a link 30, secured at the end of the cable, which link, when drawn to the end of the tunnel, is held in place by the spring-ratchets 31, closing in behind the shoulders upon the wings of the link, as shown in Fig. 7. Spiral springs may be used to force the trip-rods downward into contact with the lever-arms, if desired. In Figs. 10 and 11, I show the rollers 32, which are held in the upper end of the grip-beam to lessen the friction of the dogs when they are pushed upward by the trip-rods, each roller having a groove near each end, into which take the inner and outer plates 33 and 34, which hold the rollers in place, a W-shaped spring 35 forcing them into their outer position, as shown in Fig. 11. To one side of the upper end of the beam is attached the operating cord 36, which passes thence over suitable pulleys 37 to the platform for operation by the gripman. If desired, a cord or lever may be attached to the end of the dogs 23, and the dogs controlled therewith as desired by the gripman, and the mechanism within the grip-beam can thus be dispensed with.

With the mechanism shown, if the weight is at its lower point, as the car comes to the top of the grade and over the link, the grip-beam is swung into a vertical position, thus entering the slot in the link and becoming locked by the dogs 23. When the car is thus assisted down to the foot of the incline, the spring-ratchets 31 engage and hold the link, and the sliding-block 26, striking the stop-plate, swings the lever 25, and thus disengages one of the dogs 23, and the grip-beam is automatically released and swings upward. The next car, proceeding in an opposite direction, is stopped at the foot of the incline, when the grip-beam is swung into engagement with the link and the car is backed up. The lower end of the beam engaging the spring ratchets, pushes them back and the link is released, the hook upon the beam engaging the end of the link. The weight then pulls, or assists in pulling the car up the grade, and as the other end of the sliding-block 26 engages another stop-plate, the grip is released, the shoulders of the link resting against the ratchets placed in the tunnel at the top of the incline, and the car continues on its course.

On Sheet 4, I illustrate my invention as applied to a double track railway. In this form, I drill the hole for the weight near the top of the track used for the up-cars; the cable passes thence over a pulley 39, down this track to the foot of the incline, thence over a pulley 40 through a conduit between the two tracks to and around a pulley 41 into the tunnel of the second or down track. In this form, I preferably slot the lower end of the brake-beam, as shown in Fig. 17, and secure to the cable two stops 42, which, when the weight is at its upper position, are located the one just below the spring-ratchets 43, at the foot of the up track, and the other at the lower end of the down-track. The second set of spring-ratchets 44 is located at the head of the down-track, and each set has stops 45, to prevent the spring ratchets from contacting with the cable. A pulley 46 is supported upon a flexible arm 47, under the end of the cable in the tunnel at the head of the down-track, in order that the cable may be held in proper position for the engagement of the grip beam with the stop.

With this system, the operation is as follows:—As a car approaches the top of the grade on the down track, the grip-beam is drawn into a vertical position before it reaches the spring-ratchets. The cable enters the slot in the end of the beam, which, upon the movement of the car, pushes aside the ratchets, the stop thus engaging the slot in the grip. The car passes down the incline, drawing up the weight, and when the foot of the grade is reached, the sliding-block 26 strikes the stop-plate as in the single track system, and releases the upper end of the grip-bar, allowing it to swing into its inoperative position. When the block 26 strikes the stop-plate at the foot of the down track, the stop on the cable has passed the spring-ratchets at the foot of the up track, and these hold the cable in this position. The next car, being one upon the up track, as it reaches a point a little past the spring-ratchets at the foot of the grade, the grip-beam is drawn into a vertical position, the cable enters the slot therein, the car is backed up, the beam forcing the ratchets aside, the stop engages the beam, and the car is drawn up the incline where the grip is released as before.

If desired, a differential drum, shown in Figs. 13 and 14, may be used at the top of the incline, the necessary depth of the vertical conduit being thereby lessened.

The spiral spring in the weight may be so proportioned that it will act as a cushion if the weight is subjected to sudden stoppages. The pivoted ends of the spring-ratchets in the tunnel may also be cushioned longitudinally if desired by springs or rubber pads.

In the single track, no springs are necessary for the ratchets at the upper end, these ratchets being arranged as shown in Fig. 12. If it is only desired to regulate the speed of a down-going car, I omit the ratchets at the foot of the grade, and so gage the space between the weight and the hole, by the disk 18, or the rubber collar 16, or by the size of the weight itself, that when the cable is released, the fluid in the conduit passes upward slowly around the weight, which descends gradually to the bottom ready for the next car.

The vertical well or conduit may be cased if desired, and many other variations may be made in the form and arrangement of the parts, without departing from my invention, which I consider as lying broadly in the weight moving in the vertical conduit at or near the top of the incline and provided with the cable, which is seized and released by means located upon the car.

The advantages of my invention are obvious, since the heretofore useless power of the down-going car is stored up to be used in assisting the same or another car up the grade.

I claim—

1. A motor system for cars, comprising a vertical conduit near the head of an incline, a weight arranged to move within the conduit, a cable secured to the weight and extending along the incline, and means upon the car for seizing and releasing said cable, substantially as described.

2. A motor system for cars, comprising a vertical conduit near the head of an incline, a weight arranged to move within the conduit, a cable secured to the weight and extending along the incline, and automatic means upon the car for seizing and releasing said cable, substantially as described.

3. A motor system for cars, comprising a vertical conduit near the head of an incline, said conduit having a fluid therein, a weight arranged to move within the conduit, a cable secured to the weight and extending along the incline, and automatic means upon the car for seizing and releasing said cable, substantially as described.

4. A motor system for cars, comprising a vertical conduit or well near the head of an incline, a weight arranged to move within the conduit, a cable secured to the weight and extending along the incline, a grip upon the car, means for engaging said grip and disengaging it from the cable, and means for retaining the cable when released by the car, substantially as described.

5. A motor system for cars, comprising a vertical conduit or well near the head of an incline, a weight arranged to move within the conduit, a cable secured to the weight and extending along the incline, a grip upon the car, automatic means for engaging said grip with and disengaging it from the cable, and means for retaining the cable when released by the car, substantially as described.

6. A motor system for cars, comprising a vertical conduit or well near the head of an incline, a weight arranged to move within the conduit, a cable secured to the weight and extending along the incline, a grip upon the car, automatic means for engaging said grip with and disengaging it from the cable, and automatic means for retaining the cable when released by the car, substantially as described.

7. In a motor system for cars, a weight arranged to move within a vertical conduit near the head of an incline and having a cable arranged to be gripped by the car, said weight having a flexible collar, and automatic means for distending said collar whenever the speed of the weight exceeds a certain limit, substantially as described.

8. In a motor system for cars, a weight arranged to move within a vertical conduit near the head of an incline and having a cable arranged to be gripped by the car, said weight having a flexible disk acting as a valve to reduce the annular space between the weight and conduit upon a too rapid movement of said weight, substantially as described.

9. A motor system for cars, comprising a vertical conduit near the head of an incline, a weight arranged to move within the conduit, a cable secured to the weight and extending along the incline, a swinging grip upon the car, means for locking the grip when it engages the cable, and automatic means for unlocking said grip near the top and bottom of the incline, substantially as described.

10. In a system for moving vehicles, the combination of a weight, a conduit, and a fluid contained in said conduit, so as to regulate the ascent and descent of the weight in the conduit, substantially as described.

11. A motor system for cars, comprising a vertical conduit near the head of an incline, a weight arranged to move within the conduit, a cable secured to the weight and extending along the incline, a swinging grip upon the car, means for locking the grip when it engages the cable, a sliding block within the grip and connected with the said locking-means, and a stop arranged to contact with said block and thereby unlock the grip, substantially as described.

In testimony whereof I have hereunto set my hand.

JOHN B. SMITHMAN.

Witnesses:
W. P. POTTS,
JAMES K. BAKEWELL.